United States Patent
Imamiya

(10) Patent No.: US 7,070,830 B2
(45) Date of Patent: Jul. 4, 2006

(54) METHOD AND APPARATUS FOR PRODUCING ELASTOMER/STEEL WIRE COMPOSITES

(75) Inventor: Susumu Imamiya, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 498 days.

(21) Appl. No.: 09/959,600

(22) PCT Filed: Mar. 12, 2001

(86) PCT No.: PCT/JP01/01907

§ 371 (c)(1),
(2), (4) Date: Oct. 31, 2001

(87) PCT Pub. No.: WO01/72492

PCT Pub. Date: Oct. 4, 2001

(65) Prior Publication Data

US 2002/0182309 A1  Dec. 5, 2002

(30) Foreign Application Priority Data

Mar. 27, 2000  (JP) ............................. 2000-85793

(51) Int. Cl.
*B29C 70/34* (2006.01)
*B05D 5/12* (2006.01)

(52) U.S. Cl. .................. 427/119; 156/433; 156/441; 156/177; 72/274; 427/178; 118/718

(58) Field of Classification Search .............. 72/46, 72/274, 291, 43, 44; 428/375, 378, 379, 428/382, 390, 295.1, 295.4, 295.7; 156/177, 156/178, 264, 433, 439, 441, 5, 2; 425/114; 427/119, 434.6, 434.7, 178, 358; 118/718, 118/719

See application file for complete search history.

(56) References Cited

U.S. PATENT DOCUMENTS

| | | | | |
|---|---|---|---|---|
| 1,970,468 A | * | 8/1934 | McClure | 200/61.26 |
| 2,040,554 A | * | 5/1936 | Holmes | 200/61.25 |
| 3,082,292 A | * | 3/1963 | Gore | 174/117 F |
| 3,842,643 A | * | 10/1974 | Large et al. | 72/286 |
| 3,852,875 A | * | 12/1974 | McAmis et al. | 29/527.4 |
| 5,009,732 A | * | 4/1991 | Ikeda et al. | 156/177 |
| 5,436,076 A | * | 7/1995 | Nakata et al. | 428/377 |
| 6,068,918 A | * | 5/2000 | Van Der Veer et al. | 428/379 |
| 6,269,854 B1 | * | 8/2001 | Matsuo et al. | 152/152.1 |

* cited by examiner

*Primary Examiner*—Jill M. Gray
(74) *Attorney, Agent, or Firm*—Rader, Fishman & Grauer PLLC

(57) ABSTRACT

In a method of the present invention for producing elastomer/steel-wire composite, a steel wire is drawn through a plurality of drawing dies, and the steel wire is coated with an elastomer within 30 secs. after the steel wire passed through the final drawing die. An apparatus of the present invention for producing an elastomer/steel-wire composite comprises a wire drawer for drawing a steel wire through a plurality of drawing dies, and a rubber coater for coating the steel wire with an elastomer, and the coating is completed within 30 secs. after the steel wire passed through the final drawing die.

6 Claims, 2 Drawing Sheets

METHOD AND APPARATUS FOR PRODUCING ELASTOMER/STEEL WIRE COMPOSITES

TECHNICAL FIELD

The present invention relates to a method and apparatus for producing an elastomer/steel-wire composite suited as a tire material or the like and, more particularly, to a method and apparatus for producing an elastomer/steel-wire composite, which can improve the adhesiveness between a steel wire and an elastomer and can reduce the production cost.

BACKGROUND OF THE INVENTION

The product such as tires or conveyor belts usually uses a composite of unvulcanized rubber and steel wires as an intermediate material. The steel wires to be used in the product are required to draw themselves highly for developing their high strength. In order to improve the adhesiveness between the steel wires and the rubber and to enhance the lubricity at the drawing time, on the other hand, it is usual to plate the steel wires before drawn with brass or zinc.

Here, the brass-plated wires or the zinc-plated wires before drawn are covered on their surfaces with a thick oxide film. Especially the brass-plated wires plated by a heating diffusion method are seriously oxidized on their surfaces by the high heat at the diffusion time. In the brass-plated case, the oxides to be formed on the surfaces are mainly composed of a zinc oxide.

As the brass-plated wires or the zinc-plated wires having such thick oxide films before drawn are made thinner through multistage drawing dies, their oxide films having a poorer malleability than that of brass or zinc are preferentially scraped off so that the steel wires take the fresh brass or zinc surfaces having very little oxide film area at the stage to pass through the final drawing die.

The plated surfaces in this stage are high in chemical potentials and rich in reactivities. Therefore, the drawn steel wires react, when exposed to the air, with the oxygen in the air to form the oxide films again, and these oxide films become the thicker as the longer time elapses. On the other hand, the drawn steel wires produce zinc hydroxide or copper hydroxide, if exposed to a highly humid atmosphere containing much moisture, so that the deterioration of their surfaces further advance.

The steel wires thus plated with brass or zinc are characterized to be easily oxidized so that they are shipped, after drawn, with a drying agent in a strictly sealed state.

When the composite of the steel wires and the unvulcanized rubber is to be produced, on the other hand, It is necessary for preventing the oxidation before the rubber coating to protect the creel, on which the steel wire is wound, with corrosion-preventing paper or to make a strict temperature/humidity management on the stocking place of the creel or the creel used for the rubber coating step. Therefore, the cost for the facilities or for utilities is raised to cause a problem that the cost for producing the composite of the steel wires and the unvulcanized rubber is raised. If the stocking management is insufficient, on the other hand, the steel wires have their surfaces deteriorated to cause a problem that the adhesiveness between the steel wires and the rubber drops.

An object of the present invention is to provide a method and apparatus for producing an elastomer/steel-wire composite, which can improve the adhesiveness between the steel wires and the elastomer and can reduce the production cost.

DISCLOSURE OF THE INVENTION

In order to achieve the above-specified object, a method of the present invention for producing an elastomer/steel-wire composite is characterized: by drawing a steel wire through a plurality of drawing dies; and by coating said steel wire with an elastomer within 30 secs. after said steel wire passed through the final drawing die.

By thus coating the steel wire with the elastomer within 30 secs. or preferably within 10 secs. after the steel wire passed through the final drawing die, the oxidized deterioration of the wire surface is avoided, and the wire surface having acquired a high activity through the drawing treatment is coated with the elastomer so that the adhesiveness between the steel wire and the elastomer can be improved. On the other hand, the stocking management for preventing the oxidized deterioration of the steel wire is unnecessary so that the cost for producing the composite of the steel wires and elastomer can be reduced.

On the other hand, an apparatus of the present invention for producing an elastomer/steel-wire composite is characterized: by comprising a wire drawer for drawing a steel wire through a plurality of drawing dies, and a rubber coater for coating said steel wire with an elastomer; and in that the coating is completed within 30 secs. after said steel wire passed through the final drawing die.

In the present invention, it is preferred that the atmosphere from the drawing to coating of said steel wire is an inert gas. By thus leaving the steel wire having its surface activated by the drawing treatment in the atmosphere of the inert gas, it is possible to prevent the deterioration of the steel wire effectively. In this case, a stock chamber may be interposed between said wire drawer and said rubber coater and enclosing a wire passage, and said stock chamber and said wire drawer can be filled with an inert gas.

The elastomer can be exemplified by unvulcanized rubber or a resin. Especially where the elastomer is the unvulcanized rubber which coats the steel wire, it is possible to provide the unvulcanized-rubber/steel-wire composite suited as the tire materials, at a low price.

BEST MODE FOR CARRYING OUT THE INVENTION

Figure 1:
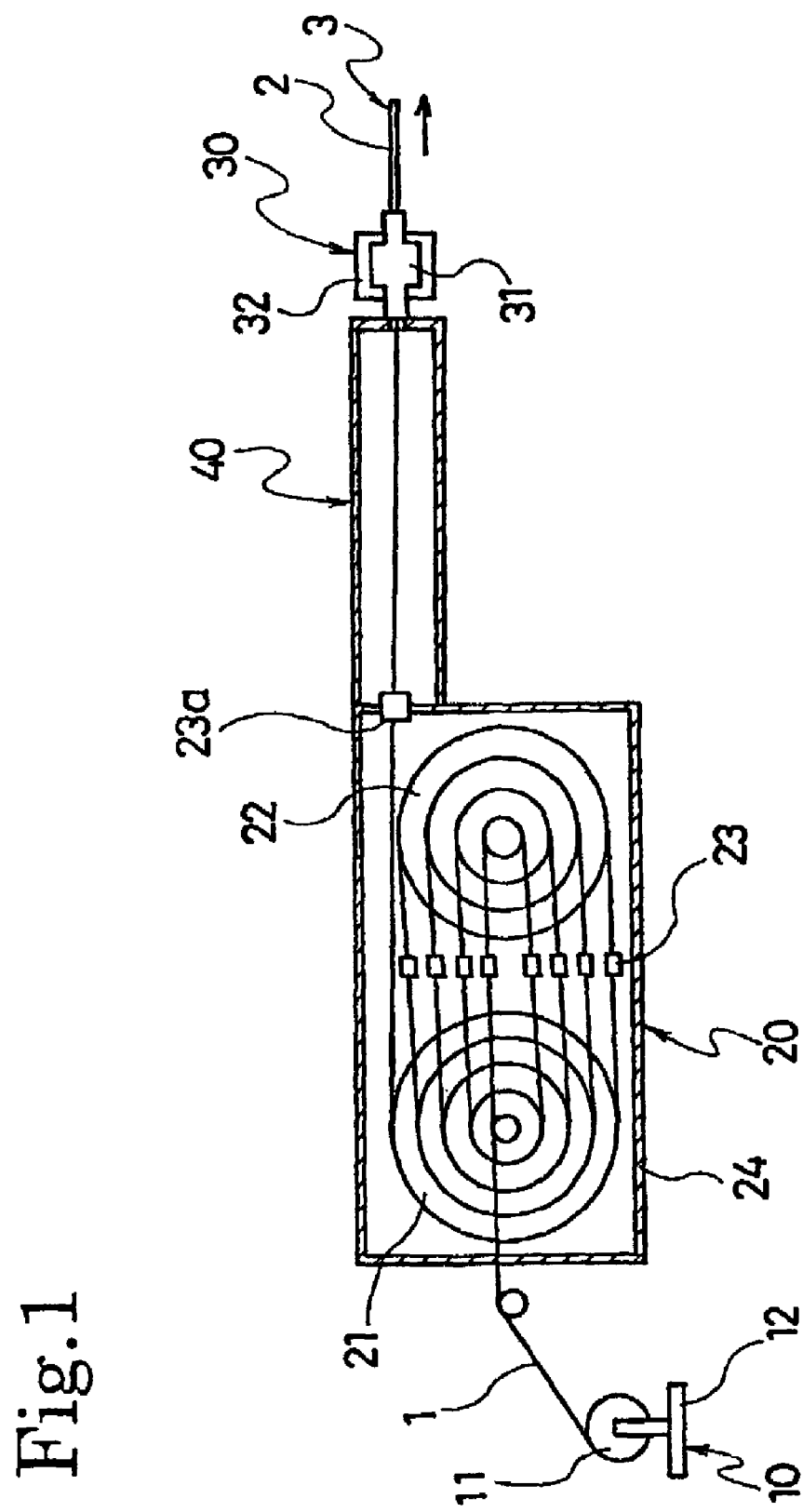
FIG. 1 is a side elevation schematically showing an apparatus for producing an elastomer/steel-wire composite according to an embodiment of the present invention.

FIG. 1 is a side elevation showing an apparatus for producing an elastomer/steel-wire composite according to an embodiment of the present invention. The production apparatus of this embodiment is constructed to include a wire supplier 10, a wire drawer 20 and a rubber coater 30 and is provided with a stock chamber 40 between the wire drawer 20 and the rubber coater 30.

The wire supplier 10 is provided with a creel stand 12 for rotatably supporting a bobbin 11 having a steel wire 1 wound thereon, thereby to supply the steel wire 1 continuously from the bobbin 11.

Figure 2:
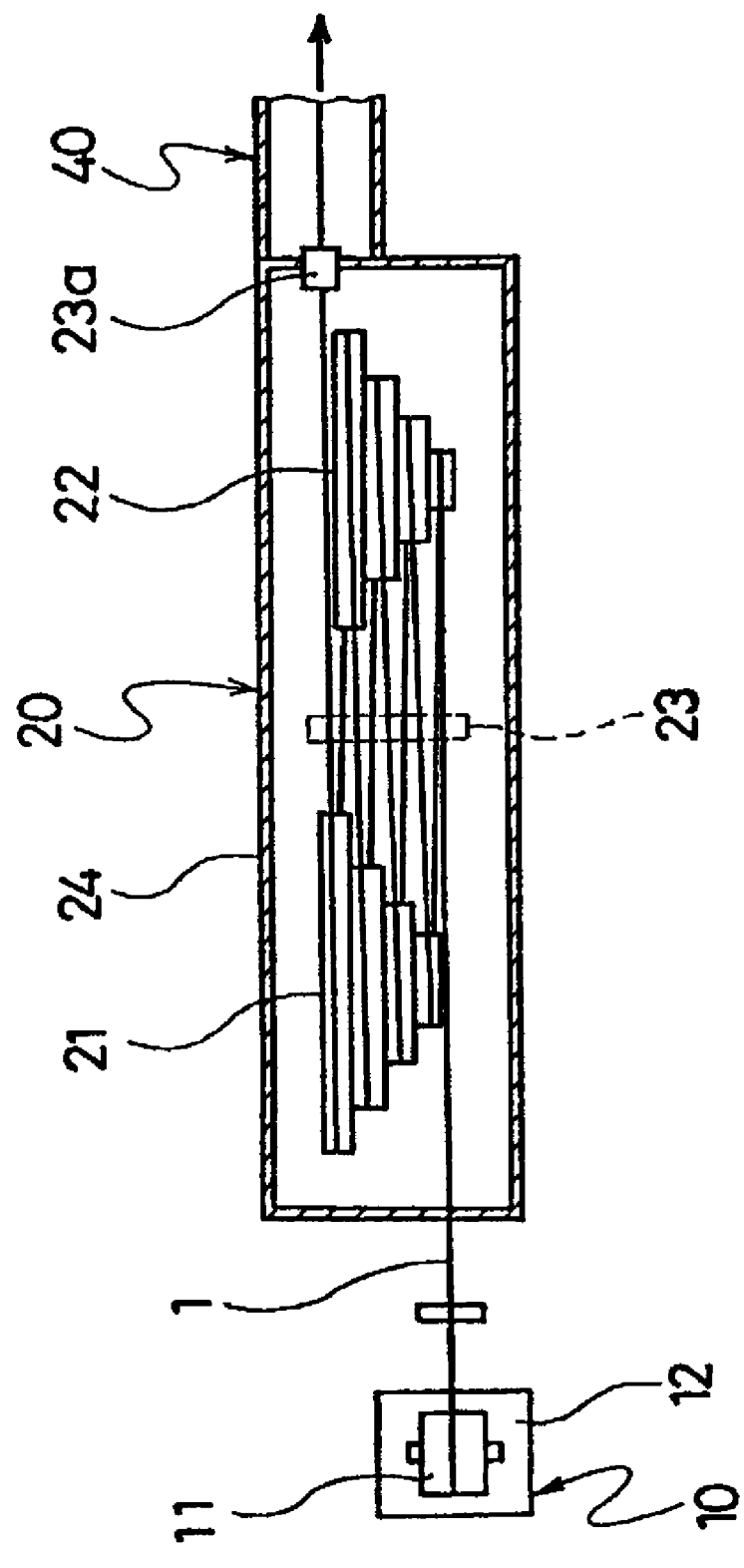
FIG. 2 is a top plan view showing a wire drawer of FIG. 1.

In the wire drawer 20, as shown in FIG. 2, there are arranged a pair of rotary drums 21 and 22 which have external diameters enlarged stepwise to make the steel wire 1 run in between. More specifically, the steel wire 1 is transferred sequentially from the smaller to larger diameter sides of the rotary drums 21 and 22 until it is discharged from the larger diameter sides. Generally at the center between the rotary drums 21 and 22 and at the position for the steel wire 1 to pass, there are arranged a number of drawing dies 23. The rotary drums 21 and 22 and the dies 23 are housed in a stock housing 24. This stock housing 24 is provided at its one side face with an entrance of the steel wire 1 and at its other side face with an exit. To this exit, there is attached a final drawing die 23a. To the stock housing 24 of the wire drawer 20, on the other hand, there is connected the not-shown inert gas supply means by which the stock housing 24 can be filled therein with an inert gas.

The rubber coater 30 is provided with a head 31 for passing the steel wire 1 therethrough, and an extruder 32 for feeding unvulcanized rubber to around the steel wire 1 through that head 31. From the discharge port of the head 31, therefore, there is discharged a composite 3 which is composed of the steel wire 1 and the unvulcanized rubber 2. This composite 3 is extracted at an arbitrary rate by the not-shown extraction means.

The stock chamber 40 encloses the passage of the steel wire 1 while connecting the wire drawer 20 and the rubber coater without any clearance. This stock chamber 40 is also connected like the stock housing 24 to the not-shown inert gas supply means so that it can be filled therein with the inert gas.

Here will be described a method of producing the elastomer/steel-wire composite by using the production apparatus thus far described.

First of all, the wire supplier 10 is set with the bobbin 11 on which the steel wire 1 plated with brass or zinc is wound, so that the steel wire 1 let off from the bobbin 11 may be continuously led to the wire drawer 20 and the rubber coater 30. Then, the stock housing 24 and the stock chamber 40 of the wire drawer 20 are filled therein, for example, with a nitrogen gas as the inert gas. Here, the stock housing 24 and the stock chamber 40 are not in a complete gas-tight state, but their inert gas atmospheres can be kept if their internal pressures are set at a higher level than the atmospheric level by feeding the inert gas continuously.

Next, the steel wire 1 is continuously extracted from the bobbin 11 and is drawn through the multistage dies 23 in the wire drawer 20. This drawn steel wire 1 is not taken up but is fed to the rubber coater 30, in which it is coated with the unvulcanized rubber 2. At this time, the coating treatment of the steel wire 1 is completed within 30 seconds after the steel wire 1 passed through the final drawing die 23a. As a result, the composite 3, as composed of the steel wire 1 and the unvulcanized rubber 2, can be continuously obtained from the rubber coater 30.

By coating the steel wire 1 with the unvulcanized rubber 2 within 30 seconds after the passage through the final drawing die 23a, according to the embodiment thus far described, the wire surface, as drawn to have a high activity, is coated with the unvulcanized rubber 2 without giving no time for oxidizing and deteriorating it, thereby to strengthen the adhesiveness between the steel wire and the rubber after the vulcanization.

Moreover, the steel wire 1 is coated as it is after drawn. It is, therefore, unnecessary unlike the prior art for preventing the oxidation and deterioration to protect the creel, on which the steel wire is wound, with corrosion-preventing paper or to make a strict temperature/humidity management on the stocking place of the creel or the creel used for the rubber coating step. Therefore, the cost for producing the composite of the steel wire and the unvulcanized rubber can be lowered more than that of the prior art thereby to provide an economic advantage.

The unvulcanized rubber to be used as the elastomer can be prepared by blending material rubber such as natural rubber (NR), styrene-butadiene copolymer rubber (SBR) or butadiene rubber (BR) with carbon black, a vulcanizing agent or a vulcanization promoter, although not especially limited thereto. Especially, the adhesiveness between the steel wires and the rubber can be improved by blending a cresol resin, a partial condensate of hexamethylol melamine pentamethylether or a cobalt salt of an organic acid. The composite of the steel wire and the unvulcanized rubber is suited as the tire material.

Where a resin such as nylon, polyethylene, polyethylene terephthalate or polypropylene is used as the elastomer, it is possible to produce a composite which can be applied to electric wires.

These elastomers may be extruded from around the steel wire from an extruder, or the steel wire may be coated by dipping it in the elastomer which has been dissolved in a solvent.

Alternatively, a single steel wire may be drawn and coated with the elastomer, or a plurality of steel wires may be simultaneously drawn and integrally coated with the elastomer.

EXAMPLES

The unvulcanized-rubber/steel-wire composites were produced on the basis of Examples 1 to 4 and Comparisons 1 to 3, which had been made different in the drawing to coating atmospheres and in the standing time periods in the atmospheres when the steel wire was to be drawn through a plurality of drawing dies and coated with the unvulcanized rubber.

The tire belt materials were produced from the unvulcanized-rubber/steel-wire composites, as had been obtained from those Examples 1 to 4 and Comparisons 1 to 3, and the pneumatic tires, in which the tire belt materials had been buried in their tread portions, were vulcanized. After these vulcanizations, the belt materials were separated from the tire casings, and the rubber adhesion percentages (%) on the separating faces were measured. These measurement results are enumerated in the Table 1.

TABLE 1

|  | Comp. 1 | Ex. 1 | Ex. 2 | Ex. 3 | Comp. 2 | Comp. 3 | Ex. 4 |
| --- | --- | --- | --- | --- | --- | --- | --- |
| Atmosphere | Air | Air | Air | Air | Air | Air | $N_2$ |
| Humidity (%) | 95 | 95 | 95 | 95 | 95 | 95 | — |
| Standing Time Period (sec.) | 28800 | 3 | 10 | 30 | 60 | 1000 | 10 |
| Rubber Adhesion % | 50 | 95 | 95 | 90 | 80 | 70 | 100 |

From this Table 1, it is found that all the Examples 1 to 4 had the high rubber adhesion percentages and the excellent adhesiveness between the steel wire and the rubber. On the other hand, the Comparisons 1 to 3 were inferior in the rubber adhesion percentages.

INDUSTRIAL APPLICABILITY

According to the present invention, as has been described hereinbefore, the steel wire is drawn through the plurality of drawing dies and is coated with the elastomer within 30 secs. after it passed through the final drawing die. Therefore, it is possible to improve the adhesiveness between the steel wire and the elastomer and to make the composite producing cost lower than that of the prior art.

What is claimed is:

1. A method for producing an elastomer/steel-wire composite, said method comprising drawing a steel wire through a plurality of drawing dies, and coating said steel wire with an elastomer within 30 seconds after said steel wire passed through the final drawing die, wherein said elastomer/steel-wire composite is suitable as a tire material, and wherein said steel wire is drawn and coated in an atmosphere of inert gas.

2. The method as set forth in claim 1, wherein said elastomer is unvulcanized rubber.

3. The method as set forth in claim 2, wherein the unvulcanized rubber is blended with a cresol resin, a partial condensate of hexamethylol melamine pentamethylether or a cobalt salt of an organic acid.

4. An apparatus for producing an elastomer/steel-wire composite, said apparatus comprising a wire drawer for drawing a steel wire through a plurality of drawing dies, a rubber coater for coating said steel wire with an elastomer, and a stock chamber disposed between said wire drawer and said rubber coater, and enclosing a wire passage, wherein said rubber coater is positioned in said apparatus to complete the coating of said steel wire within 30 seconds after said steel wire passed through the final drawing die, wherein said stock chamber and said wire drawer can be filled with an inert gas, and wherein said elastomer/steel-wire composite is suitable as a tire material.

5. The apparatus as set forth in claim 4, wherein said elastomer is unvulcanized rubber.

6. The apparatus as set forth in claim 5, wherein the unvulcanized rubber is blended with a cresol resin, a partial condensate of hexamethylol melamine pentamethylether or a cobalt salt of an organic acid.

* * * * *